US012073050B2

(12) United States Patent
Zhang et al.

(10) Patent No.: US 12,073,050 B2
(45) Date of Patent: Aug. 27, 2024

(54) TOUCH PANEL AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Yuanqi Zhang, Beijing (CN); Yang Zeng, Beijing (CN); Chang Luo, Beijing (CN); Yi Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/033,607

(22) PCT Filed: May 31, 2021

(86) PCT No.: PCT/CN2021/097264
§ 371 (c)(1),
(2) Date: Apr. 25, 2023

(87) PCT Pub. No.: WO2022/252016
PCT Pub. Date: Dec. 8, 2022

(65) Prior Publication Data
US 2023/0409154 A1 Dec. 21, 2023

(51) Int. Cl.
*G06F 3/044* (2006.01)
(52) U.S. Cl.
CPC .......... *G06F 3/0448* (2019.05); *G06F 3/0446* (2019.05)

(58) Field of Classification Search
CPC .............................. G06F 3/0448; G06F 3/0446
See application file for complete search history.

(56) References Cited

U.S. PATENT DOCUMENTS

2013/0141369 A1* 6/2013 Huang .................. G06F 3/0448
345/173
2019/0258338 A1 8/2019 Park
(Continued)

FOREIGN PATENT DOCUMENTS

CN 103389838 A 11/2013
CN 110727373 A 1/2020
(Continued)

*Primary Examiner* — Lisa S Landis
(74) *Attorney, Agent, or Firm* — ArentFox Schiff LLP; Michael Fainberg

(57) ABSTRACT

A touch panel includes: a first touch electrode including a first corner protrusion and first side protrusions including an adjacent-type first side protrusion, and a second touch electrode including a second corner protrusion and second side protrusions including an adjacent-type second side protrusion. The first side protrusion includes a second side sub-protrusion. The first corner protrusion includes a second corner sub-protrusion. The second side protrusion includes a fourth side sub-protrusion. The second corner protrusion includes a fourth corner sub-protrusion. The area of at least one of the second corner sub-protrusion and the second side sub-protrusion of the adjacent-type first side protrusion is smaller than that of the other second side sub-protrusion; and/or the area of at least one of the fourth corner sub-protrusion and the fourth side sub-protrusion of the adjacent-type second side protrusion is smaller than that of the other fourth side sub-protrusion.

20 Claims, 13 Drawing Sheets

(56) References Cited

U.S. PATENT DOCUMENTS

| | | | |
|---|---|---|---|
| 2020/0042120 A1* | 2/2020 | Gogte | G06F 3/0412 |
| 2021/0020701 A1 | 1/2021 | Zheng | |
| 2021/0397320 A1* | 12/2021 | Ye | G06F 3/0448 |
| 2021/0405815 A1 | 12/2021 | Deng et al. | |
| 2022/0011917 A1* | 1/2022 | Zhang | G06F 3/0446 |
| 2022/0276741 A1 | 9/2022 | Ye | |

FOREIGN PATENT DOCUMENTS

| | | |
|---|---|---|
| CN | 110837314 A | 2/2020 |
| CN | 111158516 A | 5/2020 |
| CN | 111668286 A | 9/2020 |
| CN | 111722762 A | 9/2020 |
| CN | 111796719 A | 10/2020 |
| CN | 111796723 A | 10/2020 |
| KR | 20120027956 A | 3/2012 |

\* cited by examiner

TOUCH PANEL AND DISPLAY DEVICE

CROSS-REFERENCE TO RELATED APPLICATIONS

This application is a National Stage of International Application No. PCT/CN2021/097264, filed May 31, 2021, the entire content of which is hereby incorporated by reference.

FIELD

The invention relates to the field of semiconductor technology, and in particular to a touch panel and a display device.

BACKGROUND

In a touch panel, detection of a touch position is realized by arranging the transmitting (Tx) electrodes and receiving (Rx) electrodes crosswise on the panel along mutually orthogonal directions.

BRIEF SUMMARY

Embodiments of the disclosure provide a touch panel and a display device. The touch panel includes a first touch electrode and a second touch electrode.

The first touch electrode includes a plurality of first touch electrode blocks sequentially arranged in a first direction and electrically connected. The first touch electrode block includes a first main body, first side protrusions located on a side of the first main body and extending out in a direction perpendicular to the side, and a first corner protrusion located in a corner region of the first main body and extending out in a direction perpendicular to a side where the first corner protrusion is located. Two adjacent first touch electrode blocks arranged in the first direction are electrically connected through first corner protrusions. The first side protrusions include: an adjacent-type first side protrusion adjacent to the first corner protrusion and located on a side different from the side where the first corner protrusion is located. The first side protrusion includes: a first side sub-protrusion and a second side sub-protrusion sequentially stacked in the direction perpendicular to and away from the side where the first side protrusion is located. The first corner protrusion includes: a first corner sub-protrusion and a second corner sub-protrusion sequentially stacked in the direction perpendicular to and away from the side where the first corner protrusion is located.

The second touch electrode includes a plurality of second touch electrode blocks sequentially arranged in a second direction and electrically connected. The second touch electrode is cross-insulated from the first touch electrode. The second touch electrode block includes a second main body, second side protrusions located on a side of the second main body and extending out in a direction perpendicular to the side, and a second corner protrusion located in a corner region of the second main body and extending out in a direction perpendicular to a side where the second corner protrusion is located. Two adjacent second touch electrode blocks arranged in the second direction are electrically connected through second corner protrusions. The second side protrusions include: an adjacent-type second side protrusion adjacent to the second corner protrusion and located on a side different from the side where the second corner protrusion is located. The second side protrusion includes: a third side sub-protrusion and a fourth side sub-protrusion sequentially stacked in the direction perpendicular to and away from the side where the second side protrusion is located. The second corner protrusion includes: a third corner sub-protrusion and a fourth corner sub-protrusion sequentially stacked in the direction perpendicular to and away from the side where the second corner protrusion is located. An area of at least one of the second corner sub-protrusion and the second side sub-protrusion of the adjacent-type first side protrusion is smaller than an area of the second side sub-protrusion of other first side protrusion; and/or, an area of at least one of the fourth corner sub-protrusion and the fourth side sub-protrusion of the adjacent-type second side protrusion is smaller than an area of the fourth side sub-protrusion of other second side protrusion.

In possible embodiments, a height of the second corner sub-protrusion in the direction perpendicular to the side where the first corner protrusion is located is smaller than a height of the second side sub-protrusion in the direction perpendicular to the side where the first side protrusion is located, so that an area of the second corner sub-protrusion is smaller than the area of the second side sub-protrusion of other first side protrusion; and/or, a height of the fourth corner sub-protrusion in the direction perpendicular to the side where the second corner protrusion is located is smaller than a height of the fourth side sub-protrusion in the direction perpendicular to the side where the second side protrusion is located, so that an area of the fourth corner sub-protrusion is smaller than the area of the fourth side sub-protrusion of other second side protrusion.

In possible embodiments, the height of the second corner sub-protrusion in the direction perpendicular to the side where the first corner protrusion is located is one-sixth to one-half of the height of the second side sub-protrusion in the direction perpendicular to the side where the first side protrusion is located; and the height of the fourth corner sub-protrusion in the direction perpendicular to the side where the second corner protrusion is located is one-sixth to one-half of the height of the fourth side sub-protrusion in the direction perpendicular to the side where the second side protrusion is located.

In possible embodiments, a side of the second corner sub-protrusion facing an adjacent first touch electrode block has a first excision portion; and/or, a side of the fourth corner sub-protrusion facing an adjacent second touch electrode block has a second excision portion.

In possible embodiments, a side of the second side sub-protrusion of the adjacent-type first side protrusion facing an adjacent first touch electrode block has a third excision portion;

and/or, a side of the fourth side sub-protrusion of the adjacent-type second side protrusion facing an adjacent second touch electrode block has a fourth excision portion.

In possible embodiments, a width of the second side sub-protrusion of the adjacent-type first side sub-protrusion in a direction parallel to the side where the adjacent-type first side sub-protrusion is located is smaller than a width of other second side sub-protrusion in a direction parallel to the side where the other first side protrusion is located;

and/or, a width of the fourth side sub-protrusion of the adjacent-type second side sub-protrusion in a direction parallel to the side where the adjacent-type second side sub-protrusion is located is smaller than a width of other fourth side sub-protrusion in a direction parallel to the side where the other second side protrusion is located.

In possible embodiments, a shape of the first excision portion is a triangle or a rectangle; a shape of the second excision portion is a triangle or a rectangle; a shape of the third excision portion is a triangle or a rectangle; and a shape of the fourth excision portion is a triangle or a rectangle.

In possible embodiments, the first side protrusions include: a separated-type first side protrusion located on a same side as the adjacent-type first side protrusion and located at a corner adjacent to a corner where the first corner protrusion is located; and an area of the second side sub-protrusion of the separated-type first side protrusion is smaller than an area of the second side sub-protrusion of other first side protrusion;

and/or, the second side protrusions include: a separated-type second side protrusion located on a same side as the adjacent-type second side protrusion and located at a corner adjacent to a corner where the second corner protrusion is located; and an area of the fourth side sub-protrusion of the separated-type second side protrusion is smaller than an area of the fourth side sub-protrusion of other second side protrusion.

In possible embodiments, a height of the second side sub-protrusion of the separated-type first side protrusion in a direction perpendicular to the side where the separated-type first side protrusion is located is smaller than a height of the second side sub-protrusion of other first side protrusion in the direction perpendicular to the side where the other first side protrusion is located; and a height of the fourth side sub-protrusion of the separated-type second side protrusion in a direction perpendicular to the side where the separated-type second side protrusion is located is smaller than a height of the fourth side sub-protrusion of other second side protrusion in the direction perpendicular to the side where the other second side protrusion is located.

In possible embodiments, the height of the second side sub-protrusion of the separated-type first side protrusion in the direction perpendicular to the side where the separated-type first side protrusion is located is one-sixth to one-half of the height of the second side sub-protrusion of other first side protrusion in the direction perpendicular to the side where the other first side protrusion is located; and the height of the fourth side sub-protrusion of the separated-type second side protrusion in the direction perpendicular to the side where the separated-type second side protrusion is located is one-sixth to one-half of the height of the fourth side sub-protrusion of other second side protrusion in the direction perpendicular to the side where the other second side protrusion is located.

In possible embodiments, a side of the separated-type first side protrusion facing an adjacent first touch electrode has a fifth excision portion;

and/or, a side of the separated-type second side protrusion facing an adjacent second touch electrode has a sixth excision portion.

In possible embodiments, a shape of the fifth excision portion is a triangle or a rectangle; and a shape of the sixth excision portion is a triangle or a rectangle.

In possible embodiments, a width of the second side sub-protrusion in a direction parallel to the side where the first side protrusion is located is smaller than a width of the first side sub-protrusion in a direction parallel to the side where the first side protrusion is located; and a width of the second corner sub-protrusion in a direction parallel to the side where the first corner protrusion is located is smaller than a width of the first corner sub-protrusion in a direction parallel to the side where the first corner protrusion is located.

In possible embodiments, the first corner protrusion includes: a first corner extension portion extending from the first corner sub-protrusion to an adjacent first touch electrode block in the direction parallel to the side where the first corner protrusion is located, and two adjacent first touch electrode blocks are electrically connected through first corner extension portions; and the second corner protrusion includes: a second corner extension portion extending from the second corner sub-protrusion to an adjacent second touch electrode block in the direction parallel to the side where the second corner protrusion is located, and two adjacent second touch electrode blocks are electrically connected through second corner extension portions.

In possible embodiments, the first touch electrode block and the second touch electrode block include a plurality of metal wires that form a metal grid, and boundaries of the first touch electrode block and the second touch electrode block are segmented by broken lines of the metal grid.

In possible embodiments, at least part of the metal grid inside the first corner protrusion is disconnected; and at least part of the metal grid inside the second corner protrusion is disconnected.

In possible embodiments, the first touch electrode blocks of the same first touch electrode are integrally connected; and the second touch electrode blocks of the same second touch electrode are bridged by a bridging portion.

In possible embodiments, the first touch electrode and the second touch electrode are in a same layer and made of a same material, there is an insulating layer between the bridging portion and a layer where the second touch electrode blocks are located, and two adjacent second touch electrode blocks are connected by the bridging portion through a via hole penetrating the insulating layer.

In possible embodiments, material of the bridging portion is same as material of the second touch electrode.

In possible embodiments, a plurality of floating electrodes are provided inside the first main body and the second main body.

Embodiments of the disclosure further provide a display device, including a display panel, and the touch panel as provided in the embodiments of the disclosure located on a light-emitting side of the display panel.

DETAILED DESCRIPTION OF THE EMBODIMENTS

In order to make the purposes, technical solutions and advantages of the embodiments of the present disclosure clearer, the technical solutions of the embodiments of the present disclosure will be described clearly and completely below in combination with the accompanying drawings of the embodiments of the present disclosure. Obviously the described embodiments are a part of the embodiments of the disclosure but not all the embodiments. Based upon the described embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The "first", "second" and similar words used in the disclosure do not represent any order, quantity or importance, and are only used to distinguish different components. The word such as "include" or "contain" or the like means that the element or object appearing before this word encompasses the elements or objects and their equivalents listed after this word, without excluding other elements or objects. The word such as "connect" or "connected" or the like is not limited to the physical or mechanical connection, but can include the electrical connection, whether direct or indirect. The words such as "up", "down", "left", "right" are only used to represent the relative position relationship. When the absolute position of a described object changes, the relative position relationship may also change accordingly.

In order to keep the following description of the embodiments of the disclosure clear and concise, the disclosure omits the detailed description of known functions and known components.

The electrode pattern in the display region (AA) is composed of electrode pattern units. In the electrode layout scheme proposed in the Flexible Multiple Layer on Cell (FMLOC) technology, the Tx electrodes and the Rx electrodes are arranged on the same layer, and the electrode pattern unit consists of three parts: Tx (transmitting electrode), Rx (receiving electrode) and Dummy (non-effect region). In order to increase the mutual capacitance value between the Tx and Rx electrodes and enhance the touch performance, boundaries of Tx and Rx are generally designed as a type of "凸". The characters of "凸" are designed to be the same in size, and the characters of "凸" for Tx and Rx are inlaid with each other, so as to increase the area of the junction of Tx and Rx. However, due to factors such as pixel size and pattern unit size, the connectivity of the electrode pattern in some regions is poor, which increases the risk of subsequent poor touch control.

Figure 1:
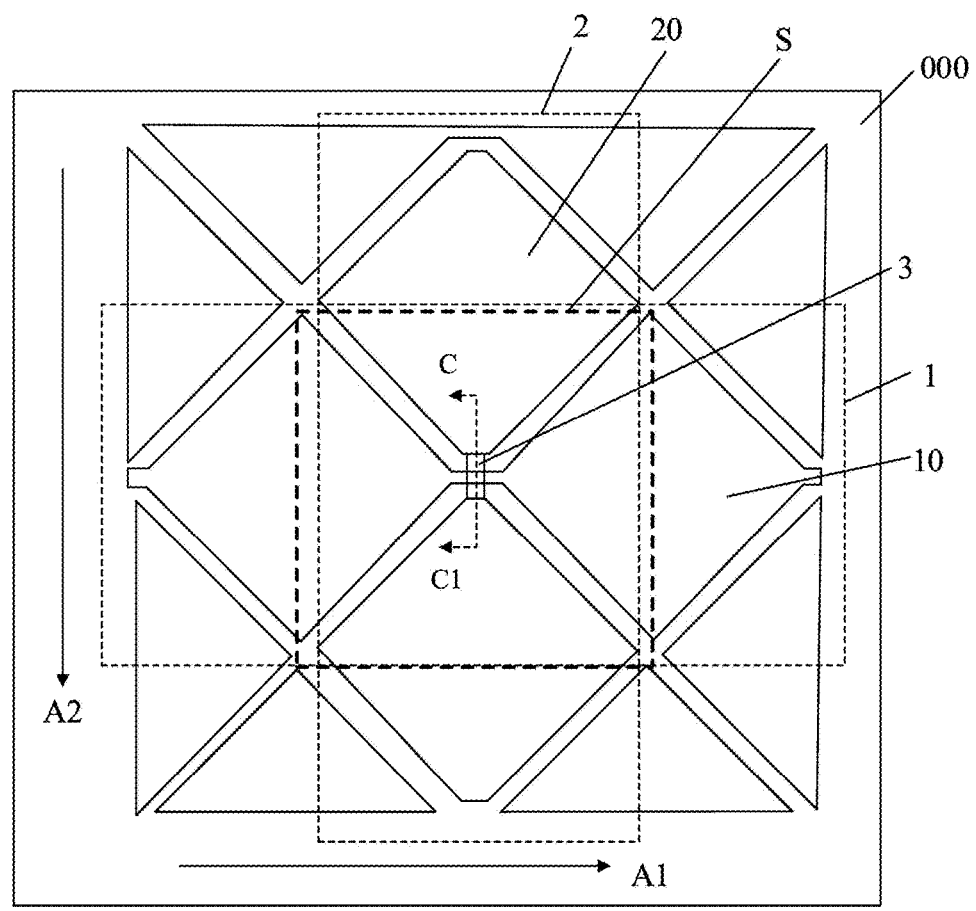
FIG. 1 is a schematic top view of a touch display panel according to an embodiment of the disclosure.
Figure 2A:
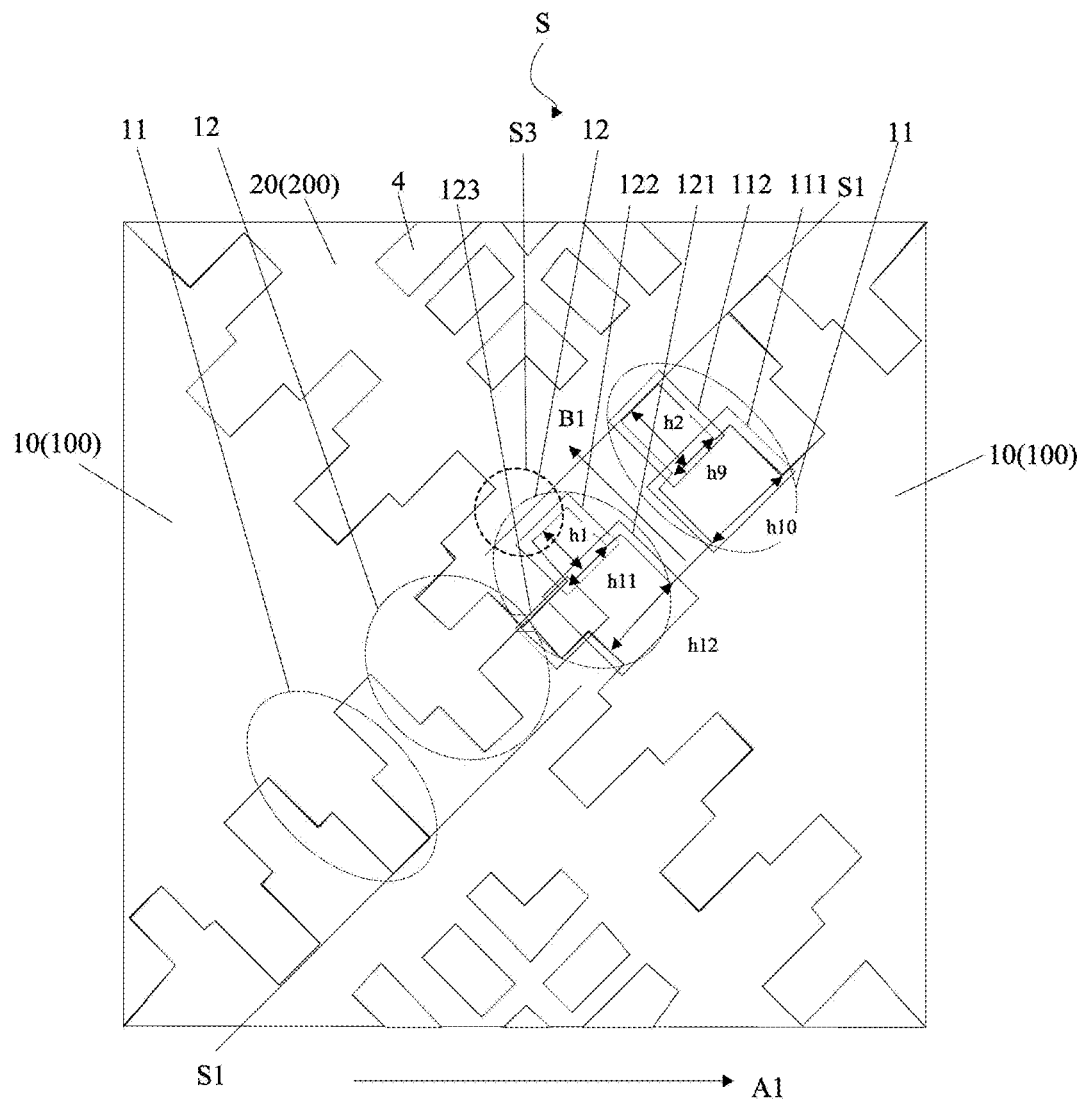
FIG. 2A is a first enlarged schematic diagram of FIG. 1 at the dotted line box S.
Figure 2B:
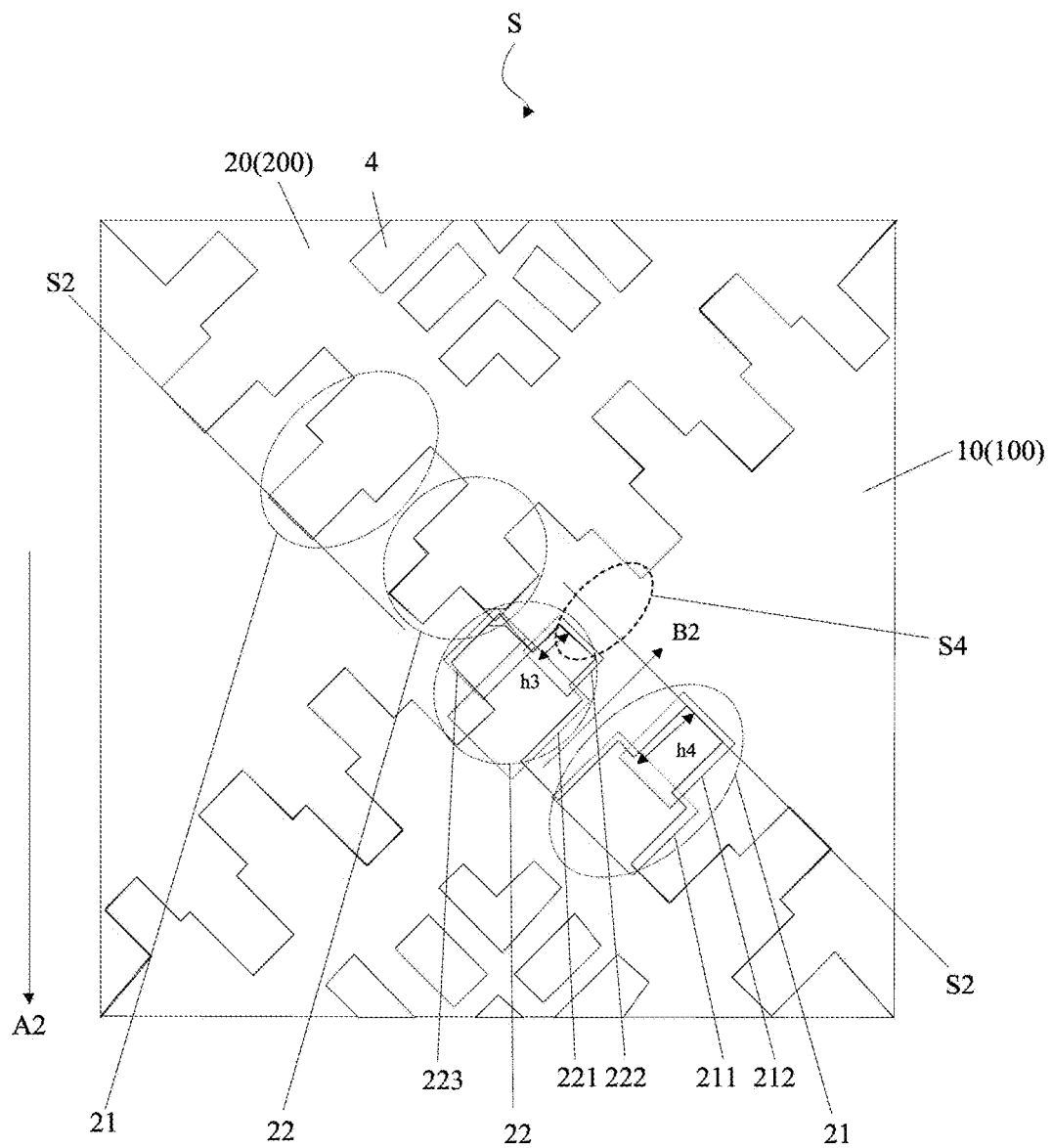
FIG. 2B is a second enlarged schematic diagram of FIG. 1 at the dotted line box S.
Figure 4A:
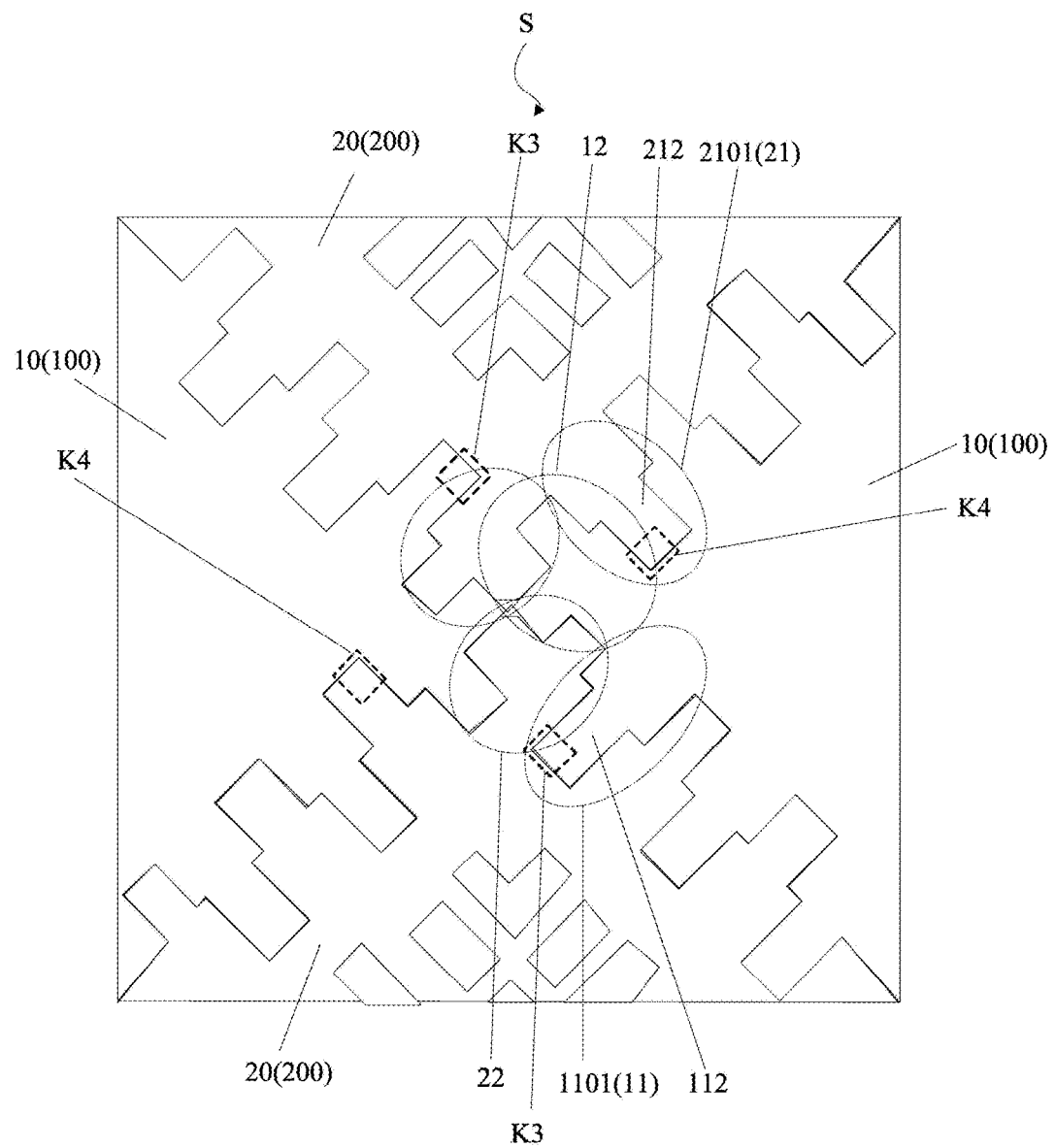
FIG. 4A is a fourth enlarged schematic diagram of FIG. 1 at the dotted line box S.

In view of this, referring to FIG. 1, FIG. 2A, FIG. 2B and FIG. 4A, where FIG. 2A, FIG. 2B and FIG. 4A are enlarged schematic diagrams of the wireframe S in FIG. 1, embodiments of the disclosure provide a touch panel including first touch electrodes 1 and second touch electrodes 2.

The first touch electrode 1 includes a plurality of first touch electrode blocks 10 sequentially arranged in a first direction A1 and electrically connected. As shown in FIG. 2A, the first touch electrode block 10 includes a first main body 100, first side protrusions 11 located on each side of the first main body 100 and extending out in a direction (as shown by the arrow B1 in FIG. 2A) perpendicular to the each side, and a first corner protrusion 12 located in a corner region of the first main body 100 and extending out in a direction (as shown by the arrow B1 in FIG. 2A) perpendicular to a side of the first main body 100 where the first corner protrusion 12 is located. Two adjacent first touch electrode blocks 10 arranged in the first direction A1 are electrically connected through first corner protrusions 12. The first side protrusions 11 include an adjacent-type first side protrusion 1101, adjacent to the first corner protrusion 12 and located on a side of the first main body 100 different from the side of the first main body 100 where the first corner protrusion 12 is located. The first side protrusion 11 includes: a first side sub-protrusion 111 and a second side sub-protrusion 112 sequentially stacked in the direction perpendicular to the side of the first main body 100 where the first side protrusion 11 is located and away from the side (as shown by the arrow B1 in FIG. 2A). The first corner protrusion 12 includes: a first corner sub-protrusion 121 and a second corner sub-protrusion 122 sequentially stacked in the direction perpendicular to the side of the first main body 100 where the first corner protrusion 12 is located and away from the side (as shown by the arrow B1 in FIG. 2A).

The second touch electrode 2 includes a plurality of second touch electrode blocks 20 sequentially arranged in a second direction A2 and electrically connected. The second touch electrodes 2 and the first touch electrodes 1 are crosswise arranged and insulated. As shown in FIG. 2B, the second touch electrode block 20 includes a second main body 200, second side protrusions 21 located on each side of the second main body 200 and extending out in a direction (as shown by the arrow B2 in FIG. 2B) perpendicular to the each side, and a second corner protrusion 22 located in a corner region of the second main body 200 and extending out in a direction (as shown by the arrow B2 in FIG. 2B) perpendicular to a side of the second main body 200 where the second corner protrusion 22 is located. Two adjacent second touch electrode blocks 20 arranged in the second direction A2 are electrically connected through second corner protrusions 22. The second side protrusions 21 include an adjacent-type second side protrusion 2101 adjacent to the second corner protrusion 22 and located on a side of the second main body 200 different from the side of the second main body 200 where the second corner protrusion 22 is located. The second side protrusion 21 includes: a third side sub-protrusion 211 and a fourth side sub-protrusion 212 sequentially stacked in the direction perpendicular to the side of the second main body 200 where the second side protrusion 21 is located and away from the side (as shown by the arrow B2 in FIG. 2B). The second corner protrusion 22 includes: a third corner sub-protrusion 221 and a fourth corner sub-protrusion 222 sequentially stacked in the direction perpendicular to the side of the second main body 200 where the second corner protrusion 22 is located and away from the side (as shown by the arrow B2 in FIG. 2B). An area of at least one of the second corner sub-protrusion 122 and the second side sub-protrusion 112 of the adjacent-type first side protrusion 1101 is smaller than an area of the second side sub-protrusion 112 of other first side protrusion 11; and/or, an area of at least one of the fourth corner sub-protrusion 222 and the fourth side sub-protrusion 212 of the adjacent-type second side protrusion 2101 is smaller than an area of the fourth side sub-protrusion 212 of other second side protrusion 21.

In the embodiments of the disclosure, the first touch electrode block 10 includes first side protrusions 11 and a first corner protrusion 12 connecting two adjacent first touch electrode blocks 10. The first side protrusion 11 includes a second side sub-protrusion 112. The first corner protrusion 12 includes a second corner sub-protrusion 122. The second touch electrode 20 includes second side protrusions 21 and a second corner protrusion 22 connecting two adjacent second touch electrode blocks 20. The area of at least one of the second corner sub-protrusion 122 and the second side sub-protrusion 112 of the adjacent-type first side protrusion 1101 is smaller than the area of the second side sub-protrusion 112 of other first side protrusion 11, so that the width of the region between the second corner sub-protrusion 122 and the first side protrusion 11 of the opposite first touch electrode block 10 (the region as shown by the dotted circle S3 in FIG. 2A) can be increased, that is, the width of the connection channel of the adjacent second touch electrode blocks 20 is increased, and the problems of poor connectivity and high resistance when the connection channel of the adjacent second touch electrode blocks 20 is relatively narrow are improved. The second side protrusion 21 includes a fourth side sub-protrusion 212. The second corner protrusion 22 includes a fourth corner sub-protrusion 222. And/or, the area of at least one of the fourth corner sub-protrusion 222 and the fourth side sub-protrusion 212 of the adjacent-type second side protrusion 2101 is smaller than the area of the fourth side sub-protrusion 212 of other second side protrusion 21, so that the width of the region between the fourth corner sub-protrusion 222 and the second side protrusion 21 of the opposite second touch electrode block 20 (the region as shown by the dotted circle S4 in FIG. 2B) can be increased, that is, the width of the connection channel of the adjacent first touch electrode blocks 10 is increased, and the problems of poor connectivity and high resistance when the connection channel of the adjacent first touch electrode blocks 10 is relatively narrow are improved.

In possible embodiments, as shown in FIG. 2A, the height h1 of the second corner sub-protrusion 122 in the direction perpendicular to the side is smaller than the height h2 of the second side sub-protrusion 112 in the direction perpendicular to the side, so that the area of the second corner sub-protrusion 122 is smaller than the area of the second side sub-protrusion 122 of other first side protrusion 11 (except the adjacent-type first side protrusion 1101). That is, the distance between the end of the second corner sub-protrusion 122 and the dotted line S1 is greater than the distance between the end of the second side sub-protrusion 112 and the dotted line S1, so that the area of the second corner sub-protrusion 122 can be smaller than the area of the second side sub-protrusion 112, and the pattern is easy to manufacture, simplifying the manufacturing process of the touch display panel. And/or, as shown in FIG. 2B, the height h3 of the fourth corner sub-protrusion 222 in the direction perpendicular to the side is smaller than the height h4 of the fourth side sub-protrusion 212 in the direction perpendicular to the side, so that the area of the fourth corner sub-protrusion 222 is smaller than the area of the fourth side sub-protrusion 222 of other second side protrusion 21 (except the adjacent-type second side protrusion 2101). That is, the distance between the end of the fourth corner sub-protrusion 222 and the dotted line S2 is greater than the distance between the end of the fourth side sub-protrusion 212 and the dotted line S2, so that the area of the fourth corner sub-protrusion 222 is smaller than the area of the fourth side sub-protrusion 212, and the pattern is easy to manufacture, simplifying the manufacturing process of the touch display panel.

For example, the height h1 of the second corner sub-protrusion 122 in the direction perpendicular to the side is one-sixth to one-half of the height h2 of the second side sub-protrusion 112 in the direction perpendicular to the side, thus improving the problems of poor connectivity and high resistance of the adjacent second touch electrode blocks 20 while also making the area of the junction between the first touch electrode block 10 and the second touch electrode block 20 larger, so that there is a larger mutual capacitance value between the first touch electrode block 10 and the second touch electrode block 20, and the touch panel has the enhanced touch performance. The height h3 of the fourth corner sub-protrusion 222 in the direction perpendicular to the side is one-sixth to one-half of the height h4 of the fourth side sub-protrusion 212 in the direction perpendicular to the side, thus improving the problems of poor connectivity and high resistance of the adjacent first touch electrode blocks 10 while also making the area of the junction between the first touch electrode block 10 and the second touch electrode block 20 larger, so that there is a larger mutual capacitance value between the first touch electrode block 10 and the second touch electrode block 20, and the touch panel has the enhanced touch performance.

Figure 3:
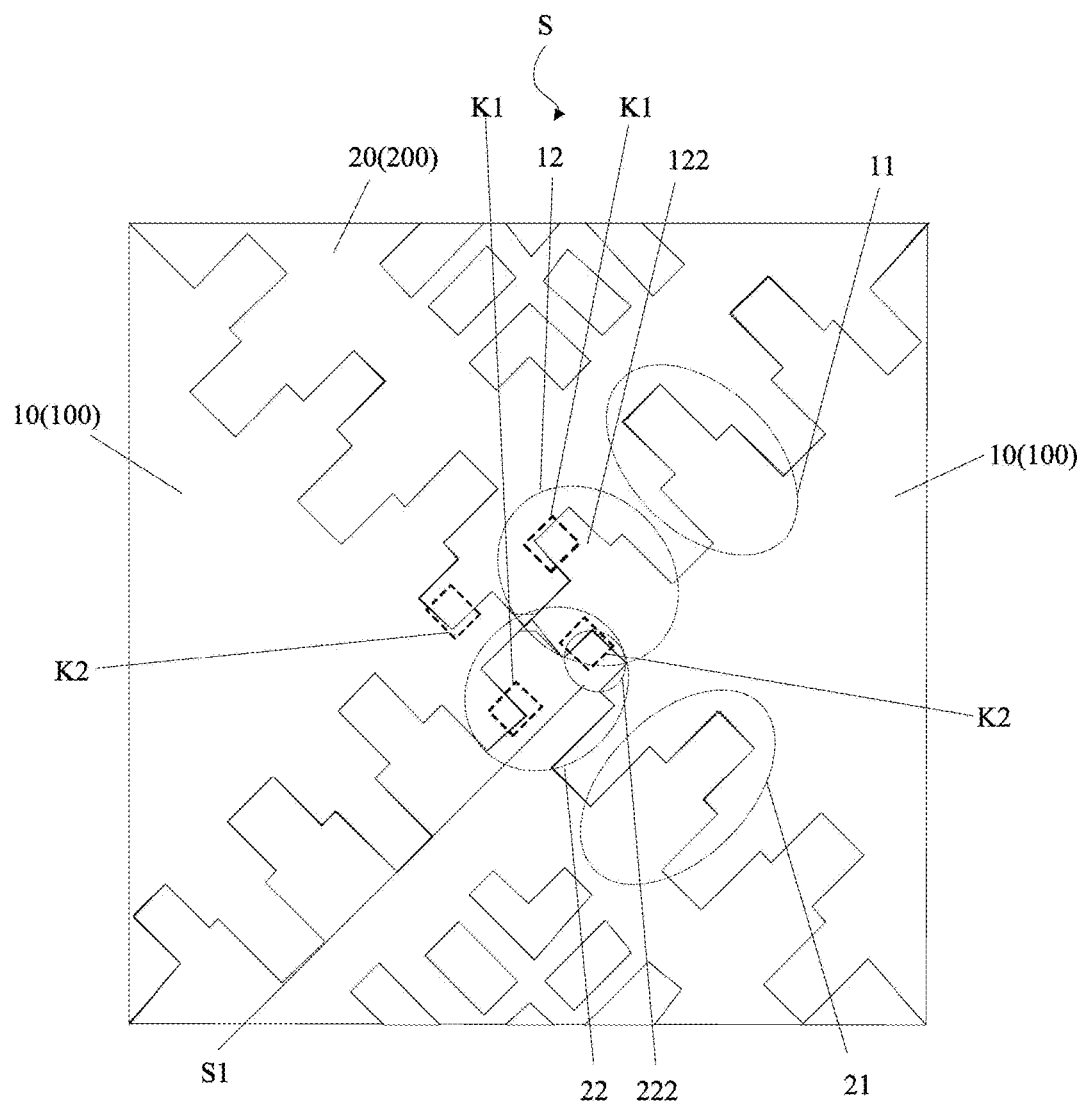
FIG. 3 is a third enlarged schematic diagram of FIG. 1 at the dotted line box S.

In possible embodiments, as shown in FIG. 3, a side of the second corner sub-protrusion 122 facing an adjacent first touch electrode block 10 has a first excision portion K1. The region where the first excision portion K1 is located is used to arrange the second touch electrode block 20, so that the area of the second corner sub-protrusion 122 can be smaller than the area of the second side sub-protrusion 112, and the pattern is easy to manufacture, simplifying the manufacturing process of the touch display panel. And/or, a side of the fourth corner sub-protrusion 222 facing an adjacent second touch electrode block 20 has a second excision portion K2. The region where the second excision portion K2 is located is used to arrange the first touch electrode block 10, so that the area of the fourth corner sub-protrusion 222 is smaller than the area of the fourth side sub-protrusion 212, and the pattern is easy to manufacture, simplifying the manufacturing process of the touch display panel.

In possible embodiments, as shown in FIG. 4A, a side of the second side sub-protrusion 112 of the adjacent-type first side protrusion 1101 facing an adjacent first touch electrode block 10 has a third excision portion K3, thus further increasing the width of the connection channel of the adjacent second touch electrode blocks 20. And/or, a side of the fourth side sub-protrusion 212 of the adjacent-type second side protrusion 2101 facing an adjacent second touch electrode block 20 has a fourth excision portion K4, thus further increasing the width of the connection channel of the adjacent first touch electrode blocks 10.

It should be noted that, in the embodiments of the disclosure, in order to clearly describe the pattern shapes of the adjusted second corner sub-protrusion 122 and fourth corner sub-protrusion 222, the description is given in the case where the second corner sub-protrusion 122 has a first excision portion K1 and the fourth corner sub-protrusion 222 has a second excision portion K2. In implementations, during the manufacturing process, the first excision portion K1 is a part removed from the second corner sub-protrusion 122 and does not belong to the structure of the second corner sub-protrusion 122, and the region where the first excision portion K1 is located is used to manufacture and arrange the second touch electrode block 20. Similarly, during the manufacturing process, the second excision portion K2 is a part removed from the fourth corner sub-protrusion 222 and does not belong to the structure of the fourth corner sub-protrusion 222, and the region where the second excision portion K2 is located is used to arrange the first touch electrode block 10. Similarly, during the manufacturing process, the third excision portion K3 is a part removed from the adjacent-type first side protrusion 1101 and does not belong to the structure of the adjacent-type first side protrusion 1101, and the region where the third excision portion K3 is located is used to arrange the second touch electrode block 20. Similarly, during the manufacturing process, the fourth excision portion K4 is a part removed from the adjacent-type second side protrusion 2101 and does not belong to the structure of the adjacent-type second side protrusion 2101, and the region where the fourth excision portion K4 is located is used to arrange the first touch electrode block 10.

Figure 4B:
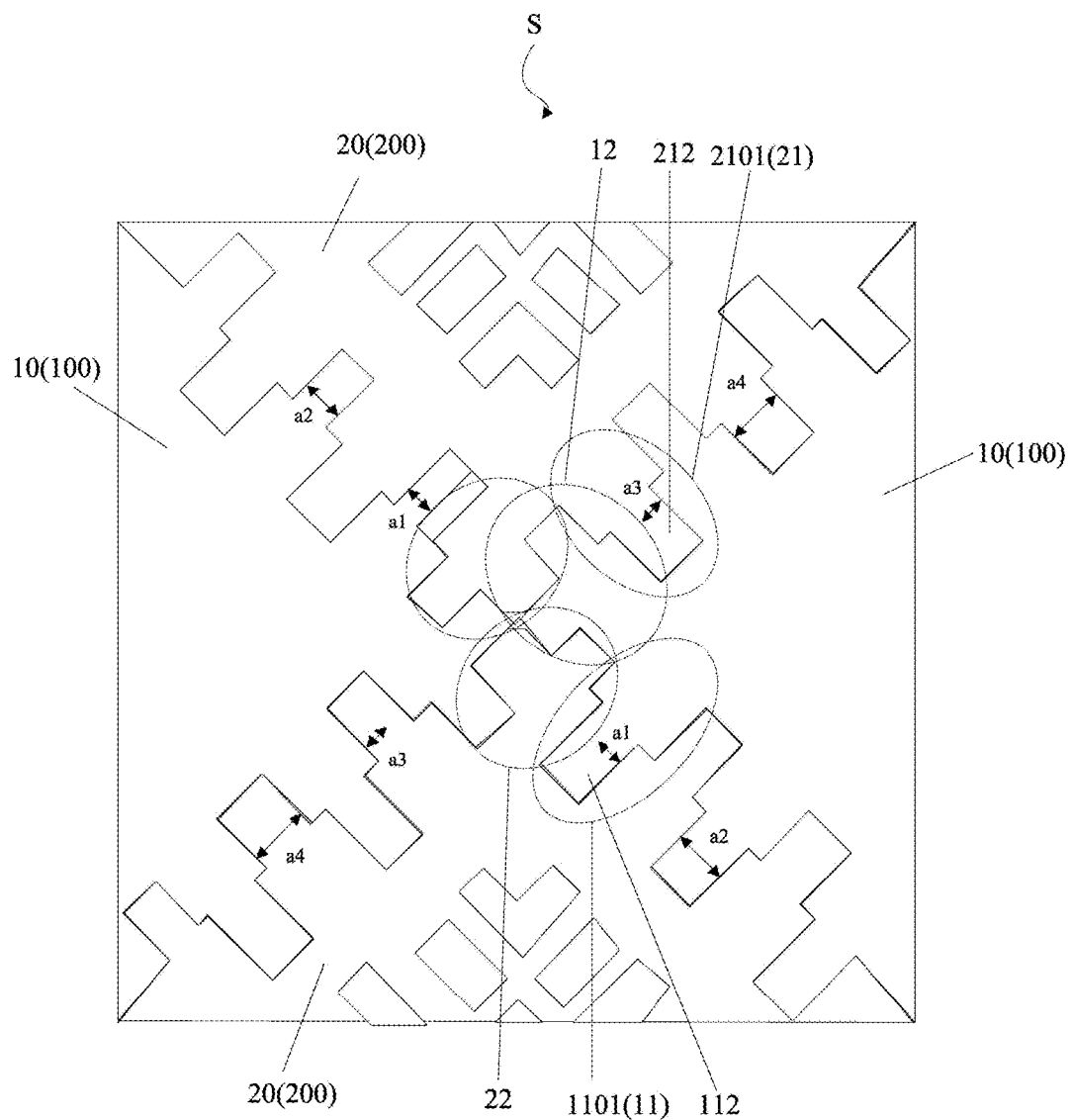
FIG. 4B is a fifth enlarged schematic diagram of FIG. 1 at the dotted line box S.

In possible embodiments, as shown in FIG. 4B, the width a1 of the second side sub-protrusion 112 of the adjacent-type first side sub-protrusion 1101 in the direction parallel to the side is smaller than the width a2 of other second side sub-protrusion 112 in the direction parallel to the side, thus further increasing the width of the connection channel of the adjacent second touch electrode blocks 20. And/or, the width a3 of the fourth side sub-protrusion 212 of the adjacent-type second side sub-protrusion 2101 in the direction parallel to the side is smaller than the width a4 of other fourth side sub-protrusion 212 in the direction parallel to the side, thus further increasing the width of the connection channel of the adjacent first touch electrode blocks 10.

In possible embodiments, the shape of the first excision portion K1 is a triangle, as shown in FIG. 3; or the shape of the first excision portion K1 may also be a rectangle. The shape of the second excision portion K2 is a triangle, as shown in FIG. 3; or the shape of the second excision portion K2 may also be a rectangle. The shape of the third excision portion K3 is a triangle, as shown in FIG. 4A; or the shape of the third excision portion K3 may also be a rectangle. The shape of the fourth excision portion K4 is a triangle, as shown in FIG. 4A; or the shape of the fourth excision portion K4 may also be a rectangle.

Figure 5A:
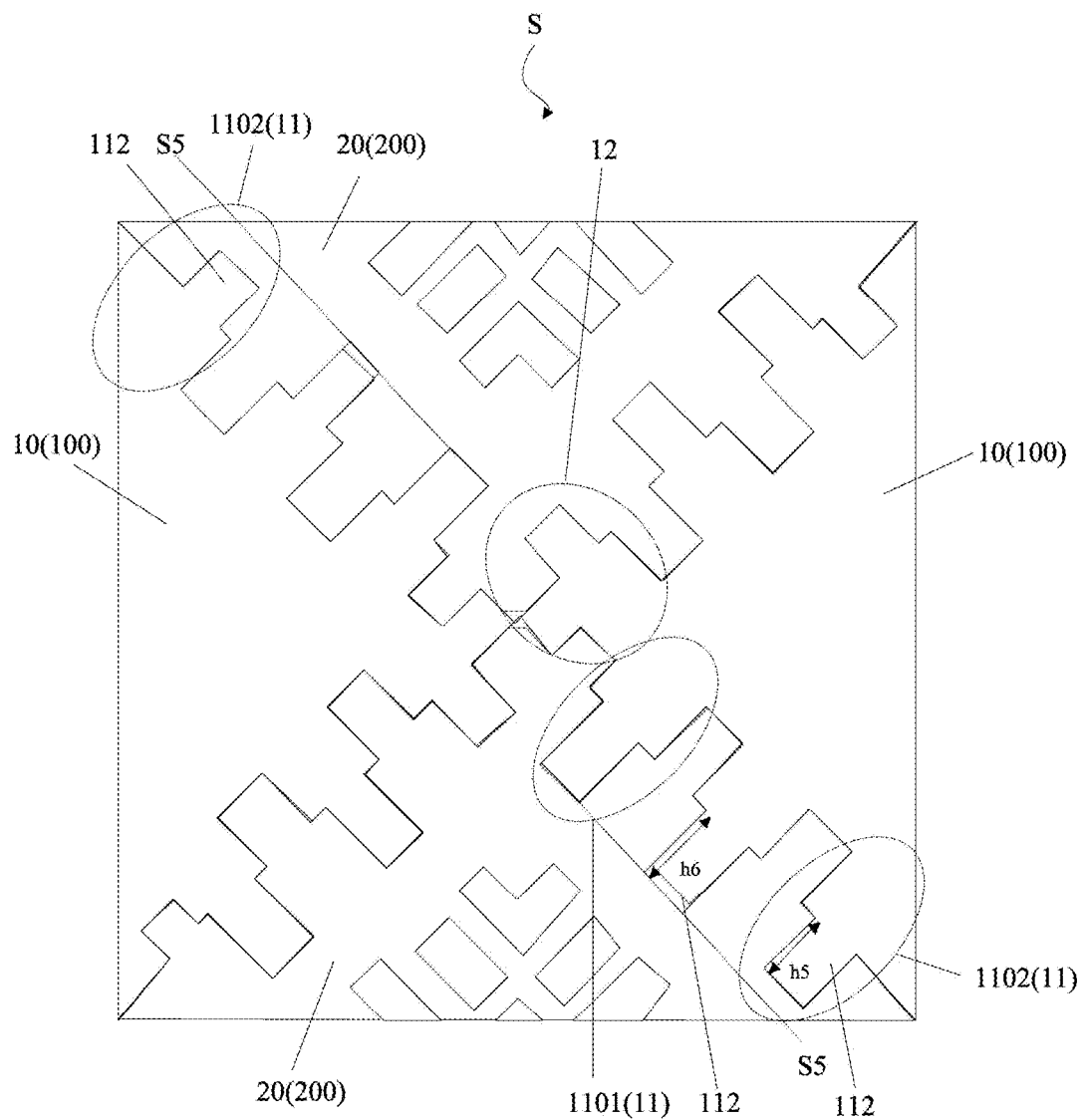
FIG. 5A is a sixth enlarged schematic diagram of FIG. 1 at the dotted line box S.
Figure 5B:
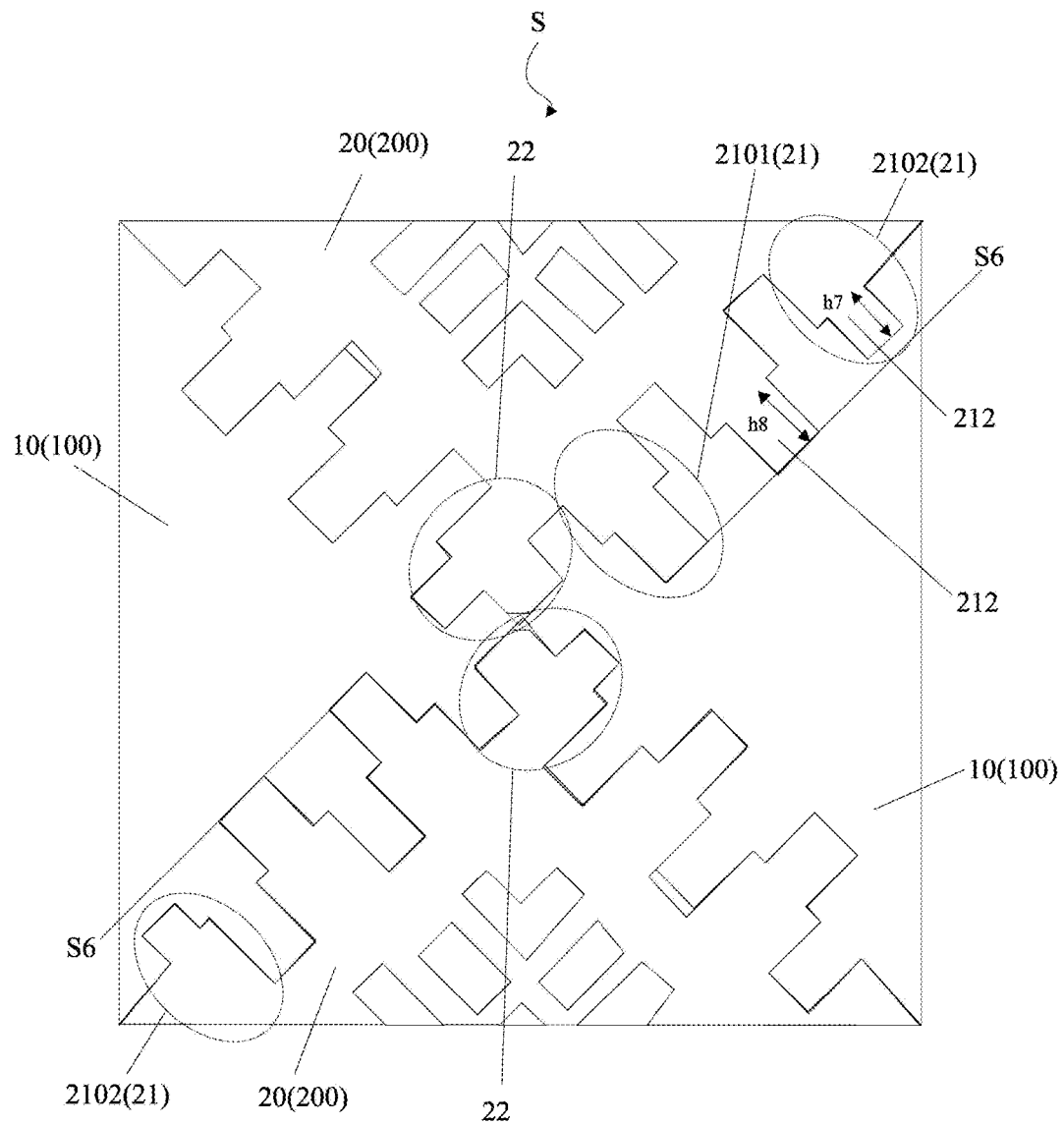
FIG. 5B is a seventh enlarged schematic diagram of FIG. 1 at the dotted line box S.

In possible embodiments, as shown in FIG. 5A, the first side protrusion 11 includes: a separated-type first side protrusion 1102 located on a same side as the adjacent-type first side protrusion 1101 and located at a corner adjacent to a corner where the first corner protrusion 12 is located. The area of the second side sub-protrusion 112 of the separated-type first side protrusion 1102 is smaller than the area of the second side sub-protrusion 112 of other first side protrusion 11. And/or, as shown in FIG. 5B, the second side protrusion 21 includes: a separated-type second side protrusion 2102 located on a same side as the adjacent-type second side protrusion 2101 and located at a corner adjacent to a corner where the second corner protrusion 22 is located. The area of the fourth side sub-protrusion 212 of the separated-type second side protrusion 2102 is smaller than the area of the fourth side sub-protrusion 212 of other second side protrusion 21. In embodiments of the disclosure, the first side protrusion 11 includes the separated-type first side protrusion 1102. The area of the second side sub-protrusions 112 of the separated-type first side protrusion 1102 is smaller than the area of the second side sub-protrusion 112 of other first side protrusion 11, which can improve the problem of poor connectivity of the second touch electrode block 20 in the non-connected region of the corner, and improve the problem that a part of electrodes on the corner of the second touch electrode block 20 cannot be connected to the second touch electrode 2 and form a touch invalid region when the separated-type first side protrusion 1102 is the same in height as other first side protrusion 11 due to the "凸" character design. The second side protrusion 21 includes the separated-type second side protrusion 2102. The area of the fourth side sub-protrusions 212 of the separated-type second side protrusion 2102 is smaller than the area of the fourth side sub-protrusion 212 of other second side protrusion 21, which can improve the problem of poor connectivity of the first touch electrode block 10 in the non-connected region of the corner, and improve the problem that a part of electrodes on the corner of the first touch electrode block 10 cannot be connected to the first touch electrode 1 and form a touch invalid region when the separated-type second side protrusion 2102 is the same in height as other second side protrusion 21 due to the "凸" character design.

In possible embodiments, as shown in FIG. 5A, the height h5 of the second side sub-protrusion 112 of the separated-type first side protrusions 1102 in the direction perpendicular to the side is smaller than the height h6 of the second side sub-protrusion 112 of other first side protrusion 11 in the direction perpendicular to the side, so that the area of the second side sub-protrusion 112 of the separated-type first side protrusion 1102 can be smaller than the area of the second side sub-protrusion 112 of other first side protrusion 11. As shown in FIG. 5B, the height h7 of the fourth side sub-protrusion 212 of the separated-type second side protrusion 2102 in the direction perpendicular to the side is smaller than the height h8 of the fourth side sub-protrusion 212 of other second side protrusion 21 in the direction perpendicular to the side, so that the area of the fourth side sub-protrusion 212 of the separated-type second side protrusion 2102 can be smaller than the area of the fourth side sub-protrusion 212 of other second side protrusion 21.

In possible embodiments, as shown in FIG. 5A, the height h5 of the second side sub-protrusion 112 of the separated-type first side protrusions 1102 in the direction perpendicular to the side is one-sixth to one-half of the height h6 of the second side sub-protrusion 112 of other first side protrusion 11 in the direction perpendicular to the side, thus improving the problem of poor connectivity of the second touch electrode block 20 in the non-connected region of the corner while also making the area of the junction between the first touch electrode block 10 and the second touch electrode block 20 larger, so that there is a larger mutual capacitance value between the first touch electrode block 10 and the second touch electrode block 20, and the touch panel has the enhanced touch performance. As shown in FIG. 5B, the height h7 of the fourth side sub-protrusion 212 of the separated-type second side protrusion 2102 in the direction perpendicular to the side is one-sixth to one-half of the height h8 of the fourth side sub-protrusion 212 of other second side protrusion 21 in the direction perpendicular to the side, thus improving the problem of poor connectivity of the first touch electrode block 10 in the non-connected region of the corner while also making the area of the junction between the first touch electrode block 10 and the second touch electrode block 20 larger, so that there is a larger mutual capacitance value between the first touch electrode block 10 and the second touch electrode block 20, and the touch panel has the enhanced touch performance.

Figure 6A:
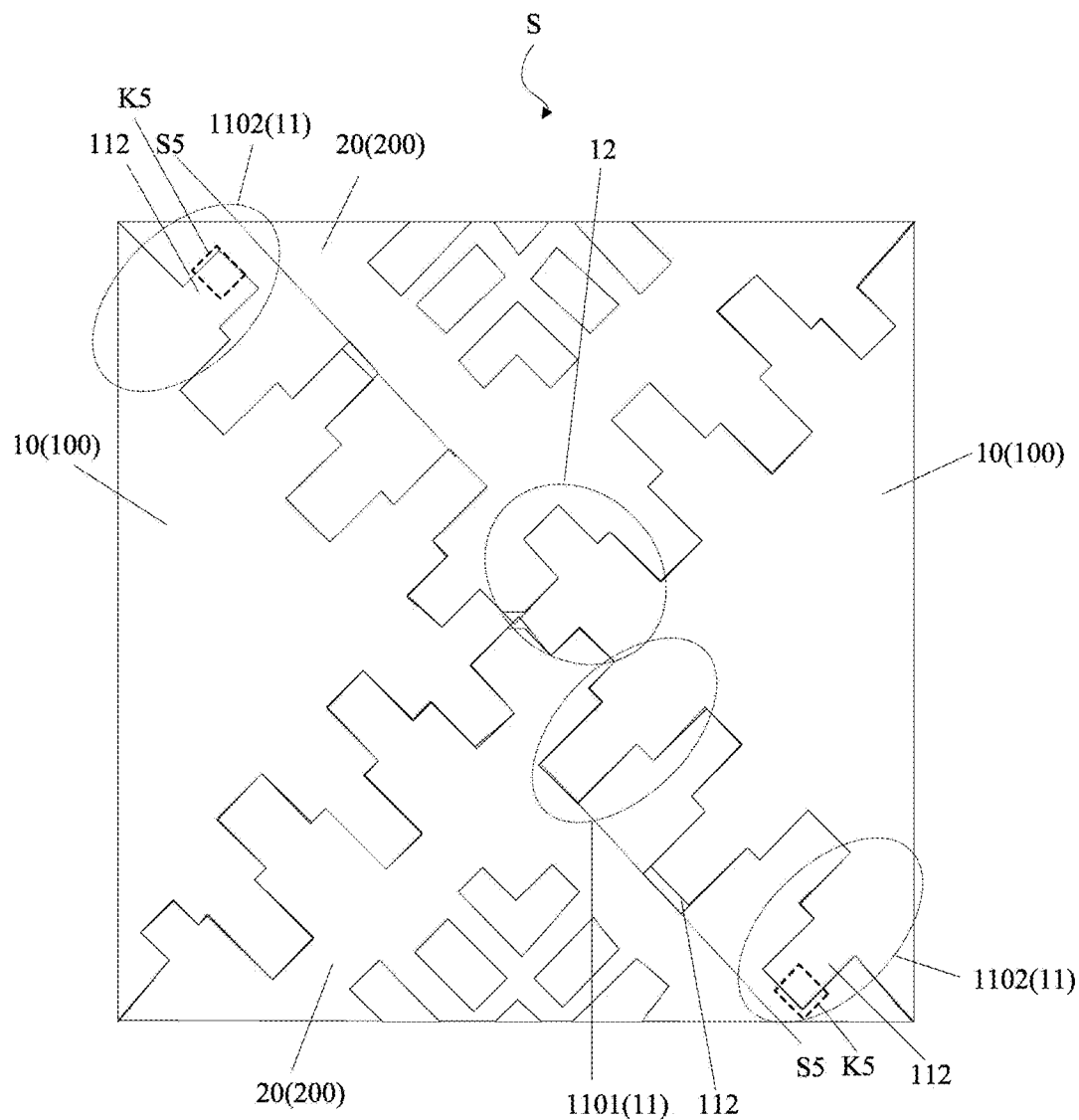
FIG. 6A is an eighth enlarged schematic diagram of FIG. 1 at the dotted line box S.
Figure 6B:
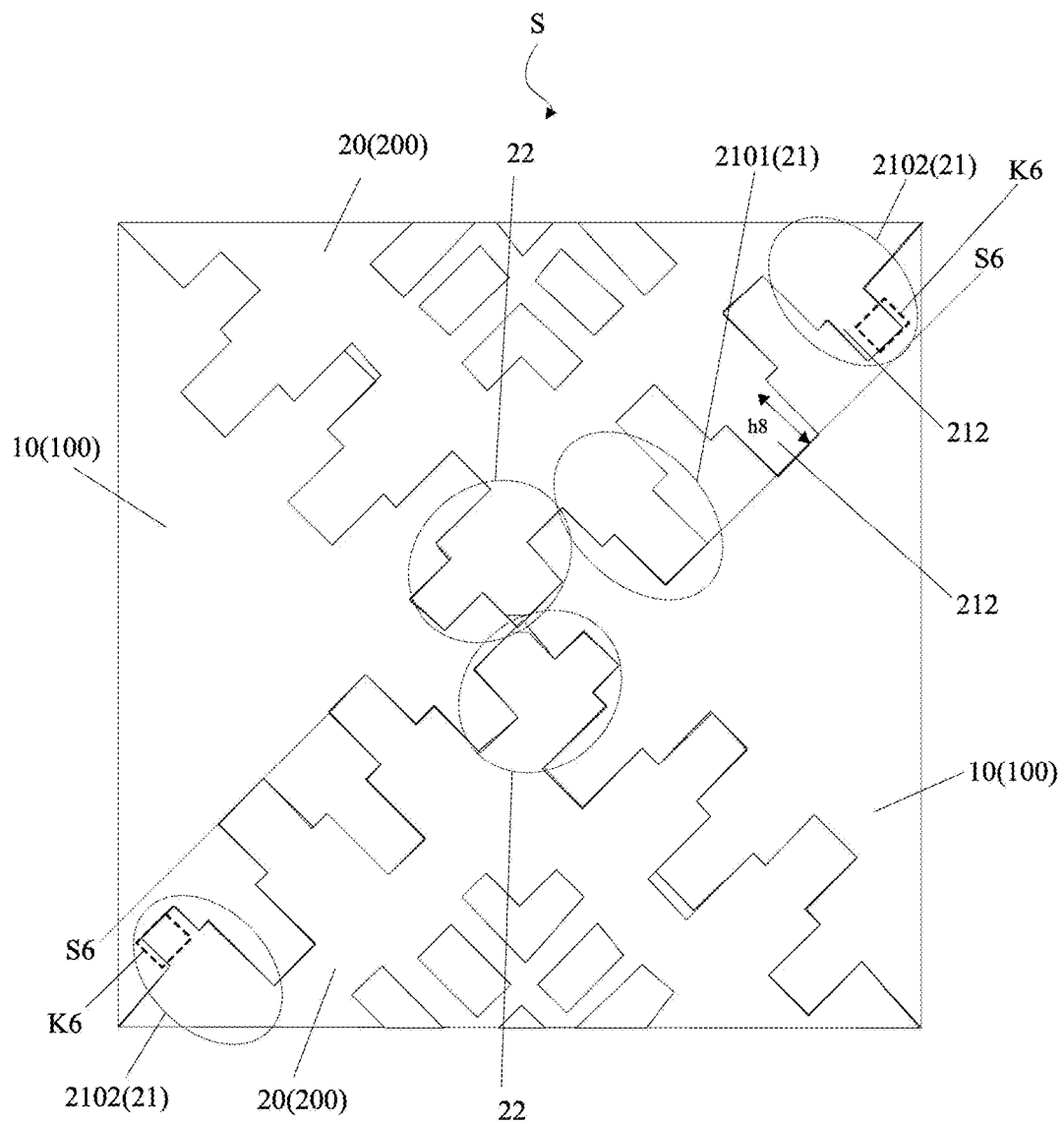
FIG. 6B is a ninth enlarged schematic diagram of FIG. 1 at the dotted line box S.

In possible embodiments, as shown in FIG. 6A, a side of the separated-type first side protrusion 1102 facing an adjacent first touch electrode 1 has a fifth excision portion K5, thus improving the problem of poor connectivity of the second touch electrode block 20 in the non-connected region of the corner. And/or, as shown in FIG. 6B, a side of the separated-type second side protrusion 2102 facing an adjacent second touch electrode 2 has a sixth excision portion K6, thus improving the problem of poor connectivity of the first touch electrode block 10 in the non-connected region of the corner.

In possible embodiments, as shown in FIG. 6A, the shape of the fifth excision portion K5 is a triangle or a rectangle. As shown in FIG. 6B, the shape of the sixth excision portion K6 is a triangle or a rectangle.

In possible embodiments, as shown in FIG. 2A, the width h9 of the second side sub-protrusion 112 in the direction parallel to the side is smaller than the width h10 of the first side sub-protrusion 111 in the direction parallel to the side. As shown in FIG. 2A, the width h11 of the second corner sub-protrusion 122 in the direction parallel to the side is smaller than the width h12 of the first corner sub-protrusion 121 in the direction parallel to the side.

In possible embodiments, as shown in FIG. 2A, the first corner protrusion 12 includes: a first corner extension portion 123 extending from the first corner sub-protrusion 121 to an adjacent first touch electrode block 10 in the direction parallel to the side, and two adjacent first touch electrode blocks 10 are electrically connected through first corner extension portions 123. As shown in FIG. 2B, the second corner protrusion 22 includes: a second corner extension portion 223 extending from the second corner sub-protrusion 221 to an adjacent second touch electrode block 20 in the direction parallel to the side, and two adjacent second touch electrode blocks 20 are electrically connected through second corner extension portions 223.

Figure 7:
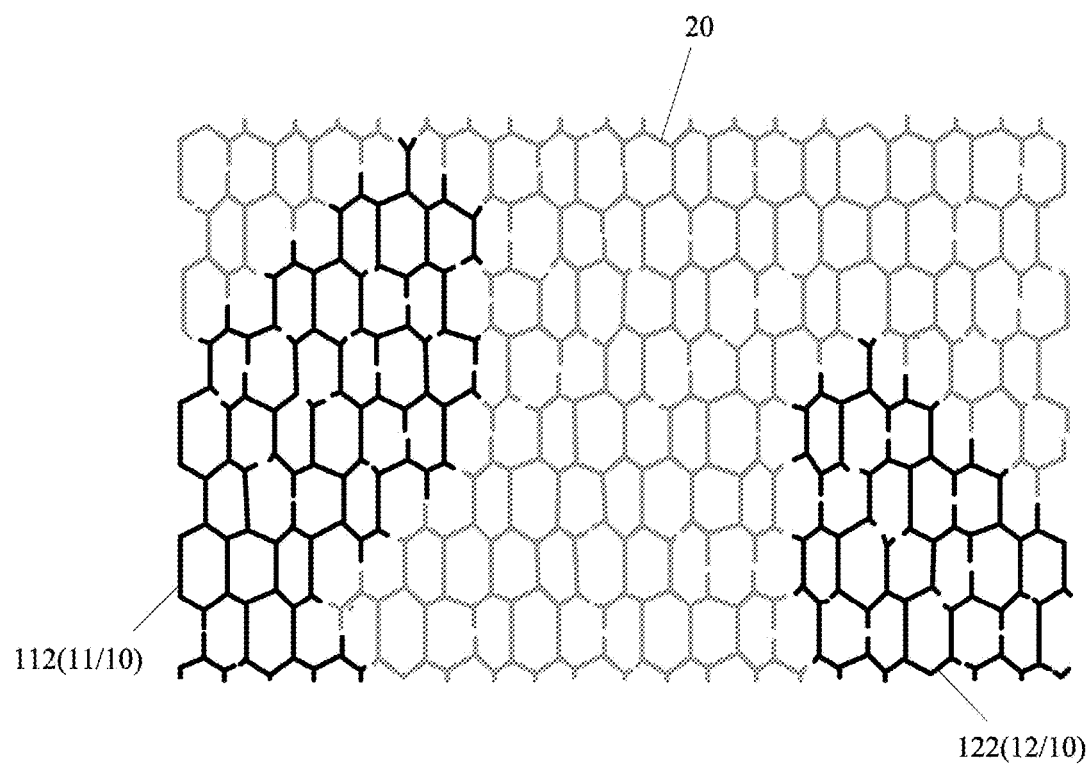
FIG. 7 is a partially enlarged schematic diagram of a connection channel of the second touch electrode of FIG. 4A.

In possible embodiments, as shown in FIG. 7, the first touch electrode block 10 and the second touch electrode block 20 include a plurality of metal wires that form a metal grid. Boundaries of the first touch electrode block 10 and the second touch electrode block 20 are segmented by broken lines of the metal grid.

In possible embodiments, as shown in FIG. 7, at least part of the metal grid inside the first corner protrusion 12 is disconnected; and at least part of the metal grid inside the second corner protrusion 22 is disconnected.

In possible embodiments, as shown in FIG. 1, the first touch electrode blocks 10 of the same first touch electrode 1 are integrally connected; and the second touch electrode blocks 20 of the same second touch electrode 2 are bridged by a bridging portion 3.

Figure 8:
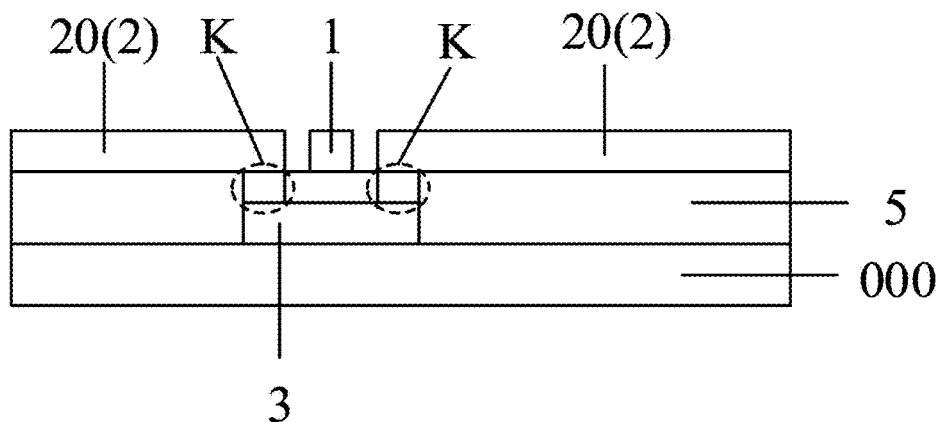
FIG. 8 is a schematic cross-sectional view of a touch panel according to an embodiment of the disclosure.

In possible embodiments, as shown in FIG. 8 which is a schematic cross-sectional view of FIG. 1 along the dotted line CC1, the first touch electrode 1 and the second touch electrode 2 are in the same layer and made of the same material. There is an insulating layer 5 between the bridging portion 3 and a layer where the second touch electrode blocks 20 are located. Two adjacent second touch electrode blocks 20 are connected by the bridging portion 3 through a via hole K penetrating the insulating layer 5.

In possible embodiments, the material of the bridging portion 3 is the same as the material of the second touch electrode 2.

In possible embodiments, as shown in FIG. 2A, a plurality of floating electrodes 4 are provided inside the first main body 10 and the second main body 20. For example, the floating electrode 4 can be understood as a structure in which an electrode pattern is provided but no electrical signal is loaded to the electrode pattern during use.

Embodiments of the disclosure further provide a display device, including a display panel, and the touch panel as provided in the embodiments of the disclosure located on a light-emitting side of the display panel.

Figure 9:
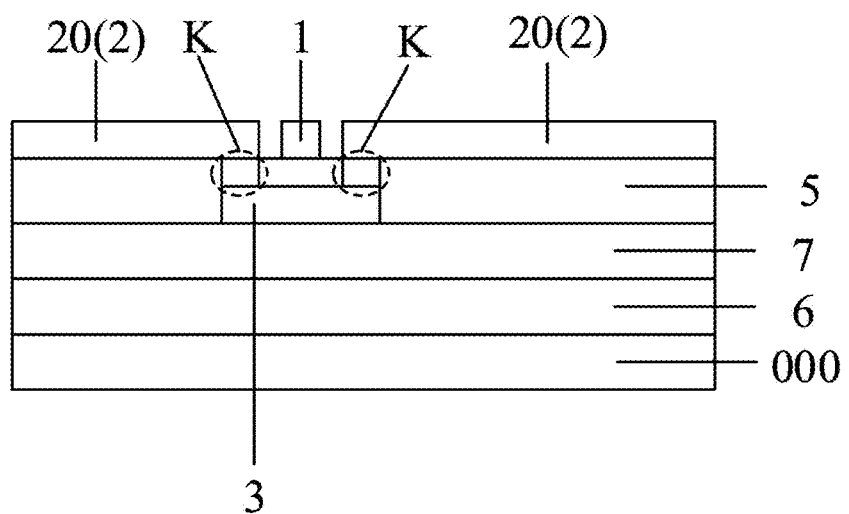
FIG. 9 is a schematic cross-sectional view of a display device according to an embodiment of the disclosure.

For example, as shown in FIG. 9, the display device may include a base substrate 000, a display layer 6 located between the base substrate 000 and the bridging portion 3, and an encapsulation layer 7 located between the display layer 6 and the bridging portion 3.

Figure 10:
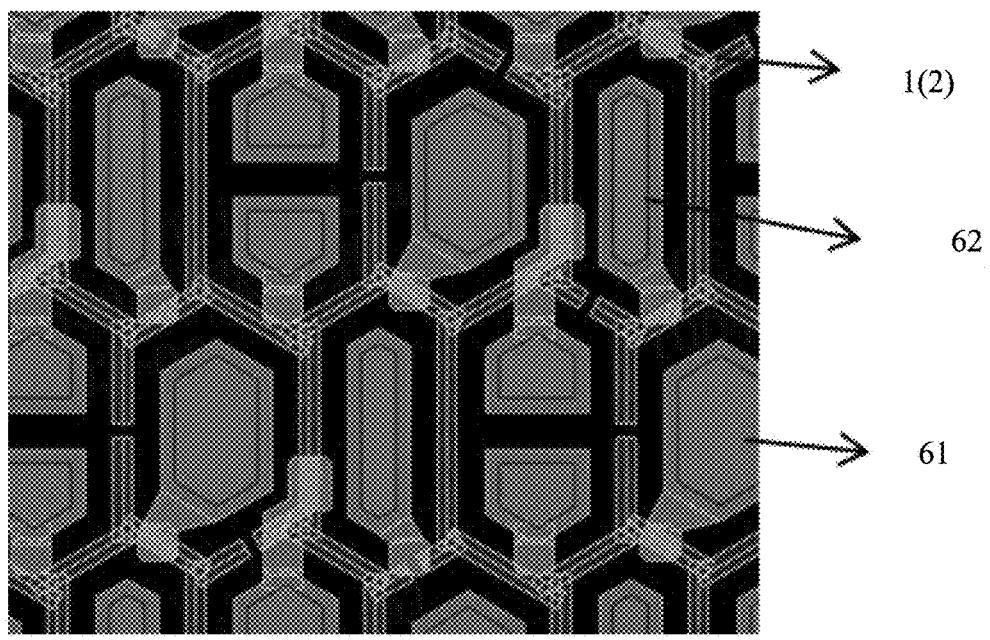
FIG. 10 is a schematic diagram of a relationship between the first touch electrode and the anode according to an embodiment of the disclosure.

For example, as shown in FIG. 10, the display layer 6 may include a light emitting device. The light emitting device may include an anode layer having a plurality of anodes 61, and a pixel definition layer having pixel openings 62. The metal grids constituting the first touch electrode 1 and the second touch electrode 2 correspond to the pixel openings 62 one by one.

For example, the display layer 6 may include a driving layer for driving the light emitting device. The driving layer may include a pixel circuit for driving the light emitting device to emit light. The pixel circuit may include a thin film transistor and a capacitor. For example, the structure of the pixel circuit and the structure of the light emitting device may be the same as those of the organic light-emitting display panel and the quantum dot light-emitting display panel in the prior art, and will not be repeated in the disclosure.

During implementations, in embodiments of the disclosure, the display device may be a mobile phone, a tablet, a television, a display, a laptop, a digital photo frame, a navigator, a watch, a bracelet or any other product or component with display function. All of other indispensable components of the display device should be understood by those ordinary skilled in the art to be included, and will be omitted here and should not be considered as limitations on the disclosure.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A touch panel, comprising:
   a first touch electrode comprising:
      a plurality of first touch electrode blocks sequentially arranged in a first direction and electrically connected;
      wherein the first touch electrode block comprises:
         a first main body, wherein an outline of the first main body is substantially a quadrilateral, sides of the quadrilateral are sides of the first main body, and top corners of the quadrilateral are corner regions of the first main body, first side protrusions located on a side of the first main body and extending out in a direction perpendicular to the side, and a first corner protrusion located in a corner region of the first main body and extending out in a direction perpendicular to a side where the first corner protrusion is located;

wherein two adjacent first touch electrode blocks arranged in the first direction are electrically connected through the first corner protrusions;

the first side protrusions comprise:
an adjacent-type first side protrusion, adjacent to the first corner protrusion and located on a side different from the side where the first corner protrusion is located;

the first side protrusion comprises:
a first side sub-protrusion and a second side sub-protrusion sequentially stacked in the direction perpendicular to and away from the side where the first side protrusion is located; and the first corner protrusion comprises:
a first corner sub-protrusion and a second corner sub-protrusion sequentially stacked in the direction perpendicular to and away from the side where the first corner protrusion is located; and a second touch electrode comprising:
a plurality of second touch electrode blocks sequentially arranged in a second direction and electrically connected, wherein the first direction intersects with the second direction;

wherein the second touch electrode and the first touch electrode are crosswise arranged and insulated, the first touch electrode blocks and the second touch electrode blocks are arranged alternatively in a third direction, and the third direction intersects with both the first direction and the second direction;

the second touch electrode block comprises:
a second main body, wherein an outline of the second main body is substantially a quadrilateral, sides of the quadrilateral are sides of the second main body, and top corners of the quadrilateral are corner regions of the second main body, second side protrusions located on a side of the second main body and extending out in a direction perpendicular to the side, and a second corner protrusion located in a corner region of the second main body and extending out in a direction perpendicular to a side where the second corner protrusion is located;

wherein two adjacent second touch electrode blocks arranged in the second direction are electrically connected through the second corner protrusions;

the second side protrusions comprise:
an adjacent-type second side protrusion, adjacent to the second corner protrusion and located on a side different from the side where the second corner protrusion is located;

the second side protrusion comprises:
a third side sub-protrusion and a fourth side sub-protrusion sequentially stacked in the direction perpendicular to and away from the side where the second side protrusion is located; and the second corner protrusion comprises:
a third corner sub-protrusion and a fourth corner sub-protrusion sequentially stacked in the direction perpendicular to and away from the side where the second corner protrusion is located;

wherein an area of at least one of the second corner sub-protrusion and the second side sub-protrusion of the adjacent-type first side protrusion is smaller than an area of the second side sub-protrusion of other first side protrusion; and/or, an area of at least one of the fourth corner sub-protrusion and the fourth side sub-protrusion of the adjacent-type second side protrusion is smaller than an area of the fourth side sub-protrusion of other second side protrusion.

2. The touch panel according to claim 1, wherein:
a height of the second corner sub-protrusion in the direction perpendicular to the side where the first corner protrusion is located is smaller than a height of the second side sub-protrusion in the direction perpendicular to the side where the first side protrusion is located, so that an area of the second corner sub-protrusion is smaller than the area of the second side sub-protrusion of other first side protrusion; and/or, a height of the fourth corner sub-protrusion in the direction perpendicular to the side where the second corner protrusion is located is smaller than a height of the fourth side sub-protrusion in the direction perpendicular to the side where the second side protrusion is located, so that an area of the fourth corner sub-protrusion is smaller than the area of the fourth side sub-protrusion of other second side protrusion.

3. The touch panel according to claim 2, wherein the height of the second corner sub-protrusion in the direction perpendicular to the side where the first corner protrusion is located is one-sixth to one-half of the height of the second side sub-protrusion in the direction perpendicular to the side where the first side protrusion is located; and the height of the fourth corner sub-protrusion in the direction perpendicular to the side where the second corner protrusion is located is one-sixth to one-half of the height of the fourth side sub-protrusion in the direction perpendicular to the side where the second side protrusion is located.

4. The touch panel according to claim 1, wherein:
a side of the second corner sub-protrusion facing an adjacent first touch electrode block has a first excision portion; and/or, a side of the fourth corner sub-protrusion facing an adjacent second touch electrode block has a second excision portion.

5. The touch panel according to claim 4, wherein:
a side of the second side sub-protrusion of the adjacent-type first side protrusion facing an adjacent first touch electrode block has a third excision portion; and/or, a side of the fourth side sub-protrusion of the adjacent-type second side protrusion facing an adjacent second touch electrode block has a fourth excision portion.

6. The touch panel according to claim 4, wherein:
a width of the second side sub-protrusion of the adjacent-type first side sub-protrusion in a direction parallel to the side where the adjacent-type first side sub-protrusion is located is smaller than a width of the second side sub-protrusion of other first side protrusion in a direction parallel to the side where the other first side protrusion is located; and/or, a width of the fourth side sub-protrusion of the adjacent-type second side sub-protrusion in a direction parallel to the side where the adjacent-type second side sub-protrusion is located is smaller than a width of the fourth side sub-protrusion of other second side protrusion in a direction parallel to the side where the other second side protrusion is located.

7. The touch panel according to claim 5, wherein a shape of the first excision portion is a triangle or a rectangle; a shape of the second excision portion is a triangle or a rectangle; a shape of the third excision portion is a triangle or a rectangle; and a shape of the fourth excision portion is a triangle or a rectangle.

8. The touch panel according to claim 5, wherein:
the first side protrusions comprise:
    a separated-type first side protrusion located on a same side as the adjacent-type first side protrusion and located at a corner adjacent to a corner where the first corner protrusion is located;
    wherein an area of the second side sub-protrusion of the separated-type first side protrusion is smaller than an area of the second side sub-protrusion of other first side protrusion; and/or,
the second side protrusions comprise:
    a separated-type second side protrusion located on a same side as the adjacent-type second side protrusion and located at a corner adjacent to a corner where the second corner protrusion is located;
    wherein an area of the fourth side sub-protrusion of the separated-type second side protrusion is smaller than an area of the fourth side sub-protrusion of other second side protrusion.

9. The touch panel according to claim 8, wherein:
a height of the second side sub-protrusion of the separated-type first side protrusion in a direction perpendicular to the side where the separated-type first side protrusion is located is smaller than a height of the second side sub-protrusion of other first side protrusion in the direction perpendicular to the side where the other first side protrusion is located; and
a height of the fourth side sub-protrusion of the separated-type second side protrusion in a direction perpendicular to the side where the separated-type second side protrusion is located is smaller than a height of the fourth side sub-protrusion of other second side protrusion in the direction perpendicular to the side where the other second side protrusion is located.

10. The touch panel according to claim 9, wherein:
the height of the second side sub-protrusion of the separated-type first side protrusion in the direction perpendicular to the side where the separated-type first side protrusion is located is one-sixth to one-half of the height of the second side sub-protrusion of other first side protrusion in the direction perpendicular to the side where the other first side protrusion is located; and
the height of the fourth side sub-protrusion of the separated-type second side protrusion in the direction perpendicular to the side where the separated-type second side protrusion is located is one-sixth to one-half of the height of the fourth side sub-protrusion of other second side protrusion in the direction perpendicular to the side where the other second side protrusion is located.

11. The touch panel according to claim 8, wherein:
a side of the separated-type first side protrusion facing an adjacent first touch electrode has a fifth excision portion; and/or,
a side of the separated-type second side protrusion facing an adjacent second touch electrode has a sixth excision portion.

12. The touch panel according to claim 11, wherein a shape of the fifth excision portion is a triangle or a rectangle; and a shape of the sixth excision portion is a triangle or a rectangle.

13. The touch panel according to claim 1, wherein:
a width of the second side sub-protrusion in a direction parallel to the side where the first side protrusion is located is smaller than a width of the first side sub-protrusion in a direction parallel to the side where the first side protrusion is located; and
a width of the second corner sub-protrusion in a direction parallel to the side where the first corner protrusion is located is smaller than a width of the first corner sub-protrusion in a direction parallel to the side where the first corner protrusion is located.

14. The touch panel according to claim 13, wherein:
the first corner protrusion comprises:
    a first corner extension portion extending from the first corner sub-protrusion to an adjacent first touch electrode block in the direction parallel to the side where the first corner protrusion is located;
    wherein two adjacent first touch electrode blocks are electrically connected through the first corner extension portions; and
the second corner protrusion comprises:
    a second corner extension portion extending from the second corner sub-protrusion to an adjacent second touch electrode block in the direction parallel to the side where the second corner protrusion is located;
    wherein two adjacent second touch electrode blocks are electrically connected through the second corner extension portions.

15. The touch panel according to claim 1, wherein the first touch electrode block and the second touch electrode block comprise a plurality of metal wires that form a metal grid, and boundaries of the first touch electrode block and the second touch electrode block are segmented by broken lines of the metal grid.

16. The touch panel according to claim 8, wherein at least part of the metal grid inside the first corner protrusion is disconnected; and at least part of the metal grid inside the second corner protrusion is disconnected.

17. The touch panel according to claim 1, wherein the first touch electrode blocks of the same first touch electrode are integrally connected; and the second touch electrode blocks of the same second touch electrode are bridged by a bridging portion.

18. The touch panel according to claim 17, wherein the first touch electrode and the second touch electrode are in a same layer and made of a same material, an insulating layer is located between the bridging portion and a layer where the second touch electrode blocks are located, and two adjacent second touch electrode blocks are connected by the bridging portion through a via hole penetrating the insulating layer.

19. The touch panel according to claim 1, wherein a plurality of floating electrodes are provided inside the first main body and the second main body.

20. A display device, comprising a display panel, and the touch panel according to claim 1 located on a light emitting side of the display panel.

* * * * *